LAWRENCE T. ROSSI
RAYMOND L. WRINKLE
INVENTORS.

BY Lyon & Lyon
ATTORNEYS

United States Patent Office 3,427,890
Patented Feb. 18, 1969

3,427,890
CALIBRATOR
Lawrence T. Rossi, Albany, and Raymond L. Wrinkle, Oakland, Calif., assignors, by mesne assignments, to American Meter Company, Philadelphia, Pa., a corporation of Delaware
Filed Mar. 10, 1966, Ser. No. 533,360
U.S. Cl. 74—116          7 Claims
Int. Cl. F16h 29/04

ABSTRACT OF THE DISCLOSURE

A variable speed transmission for use as a calibrator has a rotary driving member provided with a concentric circular track. Two clutch elements turn concentrically with respect to the track and each has radiating arms with overrunning clutch means engaging the same track. Each clutch element has a radial slot receiving a slide block pin-connected to the driven member. The driven member is shiftable laterally with respect to the driving member to change the speed ratio between the members by stepless increments.

This invention relates to a variable speed device in which a rotary member may be driven at the same speed as a driving member or at a faster speed, the speed ratio being variable by stepless increments. This invention finds particular usefulness in a calibrator interposed between the moving member of a fluid meter and the indicating register driven thereby. For example, the calibrator may be adjusted so that the quantity of fluid as shown on the indicating register is exactly the same as the quantity of fluid which has actually passed through the meter.

The principal object of this invention is to provide a novel form of calibrator using overrunning clutch elements, and which may be adjusted within its range to vary the speed ratio between the input and output by stepless increments.

Another object is to provide a device of this type in which a pair of concentric clutch elements each have overrunning clutch parts which engage within a single concentric track surface, thereby achieving unusual compactness and minimum overall dimensions.

Another object is to provide a calibrator device of this type particularly adapted for manufacture on a quantity production basis.

These and other objects are achieved by providing a single circular track surface on the driving member which surface is engaged by overrunning clutch parts on relatively rotatable clutch elements concentric with said track surface, each of the clutch elements having a pin and slot connection to a rotary driven member, which member may be shifted laterally with respect to the driving member to provide an increase in speed. When the driven member is shifted into axial alignment with the driving member the speed ratio becomes 1:1.

Other and more detailed objects and advantages will appear hereinafter.

Figure 1:
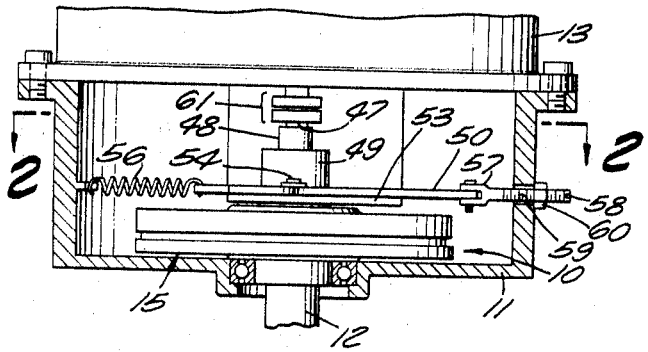
FIGURE 1 is a side elevation partly in section showing a preferred embodiment of our invention.

Referring to the drawings, the calibrator generally designated 10 is mounted within a stationary housing 11 interposed between the moving element 12 of a fluid meter and an indicating register mechanism 13. The driving member 15 of the calibrator 10 is fixed to the meter element 12 and turns as a unit therewith. This driving member 15 comprises a circular base 16 having a cover 17 attached thereto by means of suitable fastenings 18. The base 16 and cover 17 cooperate to define an internal cavity 20.

The cover 17 is provided with an internal circular track surface 21 which is concentric with the rotary axis 22 of the driving member 15.

Figure 4:
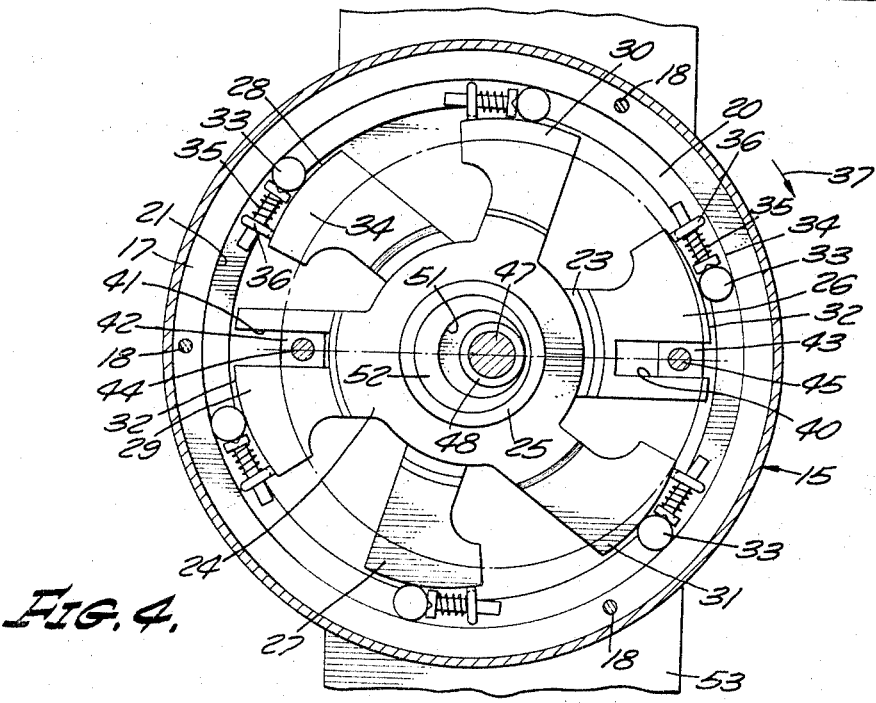
FIGURE 4 is a bottom plan view partly in section taken substantially on the lines 4—4 as shown in FIGURE 3.

A pair of clutch elements 23 and 24 are mounted within the cavity 20 for turning motion on the stationary hub 25 of the cover 17. This hub 25 is concentric with the surface 21. The clutch elements 23 and 24 are substantial duplicates. Clutch element 23 is provided with three radiating arms 26, 27 and 28. Similarly clutch element 24 is provided with three radiating arms 29, 30 and 31. Each of the arms is provided with an outer camming surface 32 facing the track surface 21 and a roller 33 contacts surfaces 32 and 21. A follower 34 urged by a spring 35 passes loosely through an eye 36 fixed to each of the arms. From this description it will be understood that turning movement of the driving member 15 in the direction shown by the arrow 37 in FIGURE 4 is effective to turn the clutch elements 23 and 24 in the same direction.

The arm 26 of the clutch element 23 is provided with a radially extending slot 40, and in similar fashion the arm 29 of the clutch element 24 is provided with a radial slot 41. A block 42 is mounted to slide in the slot 41 and a block 43 is mounted to slide in the slot 40. The block 42 has a central opening through which axial pin 44 extends. Similarly, block 43 has a central opening through which axial pin 45 extends. The axial pins 44 and 45 are parallel and are fixed on the driven member 46 which includes the driven shaft 47.

Figure 2:
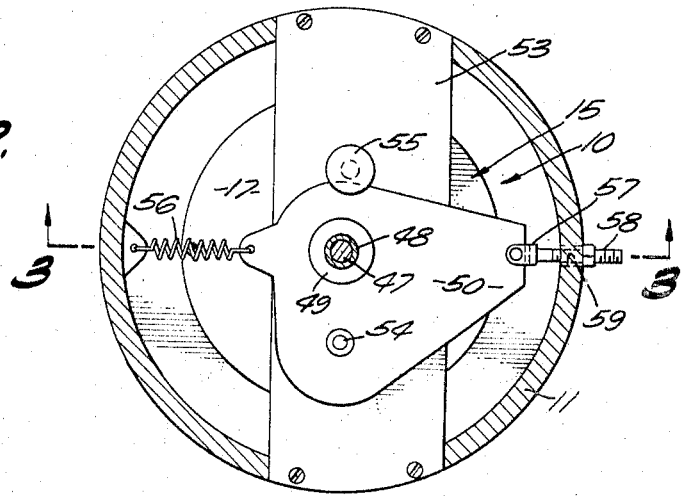
FIGURE 2 is a sectional plan view taken substantially on the lines 2—2 as shown in FIGURE 1.

The shaft 47 is carried in a tubular bearing 48 fixed in a bushing 49 and carried on the shifter plate 50. The opening 51 in the bushing 52 is eccentric and is larger than the outer diameter of the tubular bearing 48, so that the driven member 46 with its shaft 47 may be shifted laterally with respect to the driving member 15. The stationary cross piece 53 on the housing 11 supports the bushing 52 with its eccentric opening 51. The shifter plate 50 may be pivoted to the cross piece 53 at 54 and held in contact with the cross piece 53 by means of the flanged retainer 55. A tension spring 56 is attached to the housing 11 and to the shifter plate 50 and acts to move the shifter plate 50 in a counterclockwise direction about the pivot 54, as viewed in FIGURE 2. The extent of movement of the shifter plate 50 is limited by the clevis 57 and threaded rod 58 passing through an opening 59 in the housing 11. A nut 60 on the rod 58 limits the extent of movement of the shifter plate 50 under action of the coil spring 56.

Figure 3:
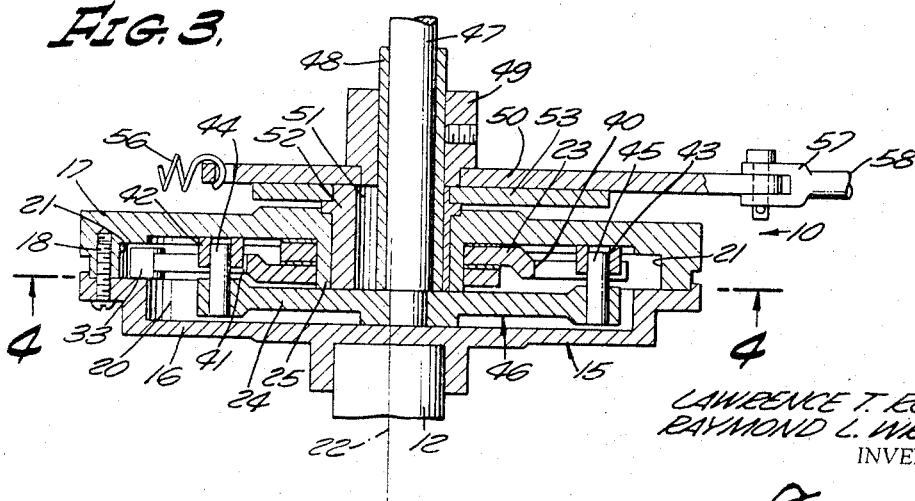
FIGURE 3 is a sectional elevation taken substantially on the lines 3—3 as shown in FIGURE 2.

When the shifter plate 50 is moved to the position shown in FIGURE 3 the driven shaft 47 is misaligned with the axis 22 of the driving member 15 to the maximum extent. When the nut 60 is loosened to permit the spring 56 to shift the plate 50 to the other extreme position of its movement the tubular bearing 48 is shifted to the left as viewed in FIGURE 3 until the axis of the shaft 47 coincides with the axis 22 of the driving member 15.

When the rotary axes of the driving member 50 and driven member 46 are coincident the members turn at the same speed. Thus, the rollers 33 wedge between the surfaces 32 and the track surface 21 on the driving member 15 with the result that the clutch elements 23 and 24 are turned at the same angular speed, and the blocks 42 and 43 do not slide in the slots 41 and 40.

Figure 5:
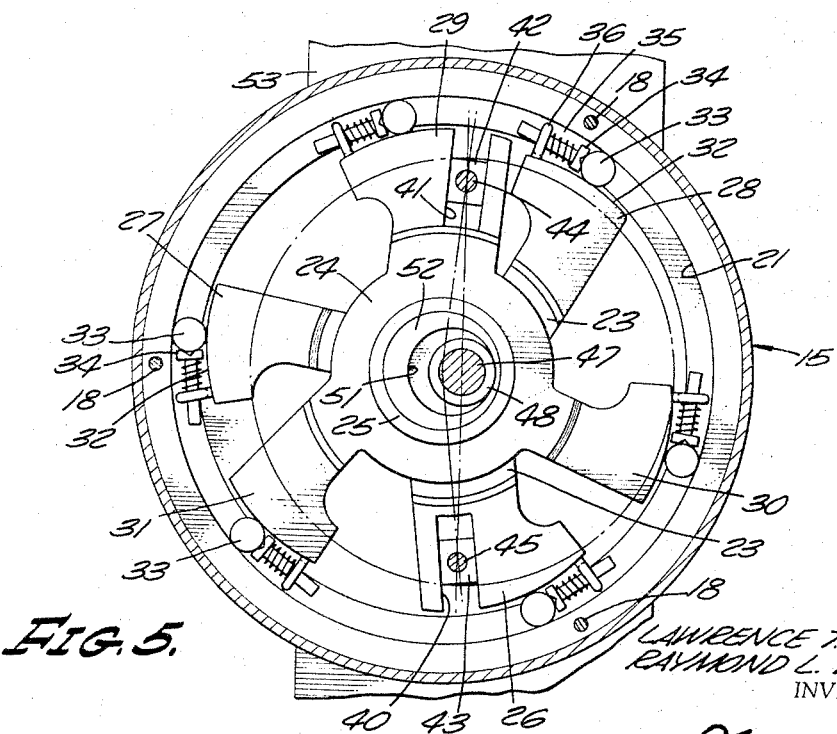
FIGURE 5 is a view similar to FIGURE 4 showing the operating parts in different position.

When the plate 50 is shifted to move the driven shaft 47 to an eccentric position as shown in FIGURES 3, 4 and 5, however, the driven member 46 and its shaft 47 are caused to rotate at a faster speed than the rotary speed of the driving member 15. The explanation of this increase in speed of the driven member is apparent from a consideration of FIGURES 4 and 5 of the drawings. In FIGURE 4 the radial slots 41 and 40 are shown in a position of alignment with the maximum eccentricity of the shaft 47 within the opening 51. When the driving member 15 turns in a clockwise direction as shown by the arrow 37 the block 42 slides outward in the slot 41 to assume the position shown in FIGURE 5. At the same time the block 43 moves to the position shown in FIGURE 5. The driven shaft 47 has been turned 90° from the position shown in FIGURE 4 to the position shown in FIGURE 5. However, the clutch element 24 has turned more than 90° and the clutch element 23 has turned less than 90°. In effect, then, the overrunning clutch parts together with the eccentric position of the driven member 46 and its shaft 47 serve to provide an overdrive for the driven member 46 causing it to turn faster than the driving member 15. The maximum overdrive effect is achieved at maximum eccentricity of the shaft 47, and the driving member and driven member turn at the same speed when they are axially aligned. The drive from shaft 47 to the register 13 may be accomplished through the magnetic coupling generally designated 61.

It will be observed that all of the rollers 33 engage the same track surface 21. The track surface 21 may be hardened to prevent "brinneling" action by the rollers 33. Moreover, it will be noted that the cam surfaces 32 are directly opposed to the circular track surface 21 so that no twisting or canting forces are applied to the rollers 33.

Having fully described our invention it is to be understood that we are not to be limited to the details herein set forth but that our invention is of the full scope of the appended claims.

We claim:

1. In a variable speed calibrator, the combination of: a first rotary member having a concentric internal circular track surface, a pair of clutch elements mounted for concentric rotation with respect to said track surface, each clutch element having overrunning clutch means engaging said track surface, said clutch means being adapted to overrun in the same direction, a second rotary member, pin and slot means employing an axially extending pin and a radially extending slot connecting said second member to each of said clutch elements, respectively, and means for laterally shifting one of said members with respect to the other member.

2. In a variable speed calibrator, the combination of: a rotary driving member having a concentric internal circular track surface, a pair of clutch elements mounted for concentric rotation with respect to said track surface, each clutch element having overrunning clutch means engaging said track surface, said clutch means being adapted to overrun in the same direction, a rotary driven member, pin and slot means employing an axially extending pin and a radially extending slot connecting said driven member to each of said clutch elements, respectively, and means for laterally shifting said driven member with respect to said driving member.

3. In a variable speed calibrator, the combination of: a rotary member having a concentric internal circular track surface, a pair of clutch elements mounted for concentric rotation with respect to said track surface, each clutch element having overrunning clutch means engaging said track surface and each having a radial slot, said clutch means being adapted to overrun in the same direction, a rotary member having a pair of axially extending pins, each pin having radial sliding movement within one of said slots, respectively, and means for laterally shifting one of said members with respect to the other member.

4. In a variable speed calibrator, the combination of: a rotary driving member having a concentric internal circular track surface, a pair of clutch elements mounted for concentric rotation with respect to said track surface, each clutch element having a plurality of overrunning clutch means engaging said track surface and each having a radial slot, said clutch means being adapted to overrun in the same direction, a rotary driven member having a pair of axially extending pins, each pin having radial sliding movement within one of said slots, respectively, and means for laterally shifting said driven member with respect to said driving member.

5. In a variable speed calibrator, the combination of: a rotary driving member having a concentric internal circular track surface, a pair of clutch elements mounted for concentric rotation with respect to said track surface, each clutch element having overrunning clutch means engaging said track surface and each having a radial slot, said clutch means being adapted to overrun in the same direction, a rotary driven member having a pair of axially extending pins, a pair of pin-receiving blocks, each block having radial sliding movement within one of said slots, respectively, and means for laterally shifting said driven member with respect to said driving member.

6. In a variable speed calibrator, the combination of: a rotary driving member having a concentric internal circular track surface, a pair of clutch elements mounted for concentric rotation with respect to said track surface, each clutch element having a plurality of arms, overrunning clutch means on each arm engaging said track surface, said clutch means being adapted to overrun in the same direction, each clutch element having a radial slot, a rotary driven member having a pair of axially extending pins, each pin having radial sliding movement within one of said slots, respectively, and means for laterally shifting said driven member with respect to said driving member.

7. In a variable speed calibrator, the combination of: a rotary driving member having a concentric internal circular track surface, a pair of clutch elements mounted for concentric rotation with respect to said track surface, each clutch element having a plurality of arms, overrunning clutch means on each arm engaging said track surface, said clutch means being adapted to overrun in the same direction, each clutch element having a radial slot, a rotary driven member having a pair of axially extending pins, a pair of pin-receiving blocks, each block having radial sliding movement within one of said slots, respectively, and means for laterally shifting said driven member with respect to said driving member.

References Cited

UNITED STATES PATENTS

| 977,449 | 12/1910 | Hayden | 74—117 |
| 3,074,294 | 1/1963 | Woolley | 74—805 |
| 3,340,743 | 9/1967 | Stageberg | 74—116 |

FOREIGN PATENTS 386,138   1/1933   Great Britain.

FRED C. MATTERN, Jr., *Primary Examiner*

W. S. RATLIFF, Jr., *Assistant Examiner.*

U.S. Cl. X.R.

74—117